United States Patent
Wulff

(10) Patent No.: US 7,353,051 B2
(45) Date of Patent: Apr. 1, 2008

(54) TORQUE CELL

(75) Inventor: Thomas Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 107 days.

(21) Appl. No.: 10/463,258

(22) Filed: Jun. 17, 2003

(65) Prior Publication Data

US 2004/0229593 A1 Nov. 18, 2004

Related U.S. Application Data

(60) Provisional application No. 60/470,008, filed on May 13, 2003.

(51) Int. Cl.
*H04M 1/00* (2006.01)

(52) U.S. Cl. ............... 455/575.4; 455/575.1; 455/90.3; 455/556.1; 455/556.2; 455/557; 455/347; 455/348; 455/349; 235/462.43; 235/462.45; 235/462.46; 235/462.47; 235/472.01; 235/472.02; 379/433.11; 379/433.12; 379/445; 379/447

(58) Field of Classification Search ......... 455/556.1–2, 455/550.1, 557, 575.1, 4, 8, 90.1–3, 347–349; 379/428.01, 428.04, 433.01, 433.11–12, 447; 429/96–100, 121, 123; 235/462.43–49, 472.01–2; 361/679–681, 724–733; 400/472–473, 490, 400/496; 178/19.01–5, 18.09; D14/429, D14/347

See application file for complete search history.

(56) References Cited

U.S. PATENT DOCUMENTS

| | | | | |
|---|---|---|---|---|
| 5,308,716 A | * | 5/1994 | Shababy et al. | ............... 429/97 |
| 5,410,141 A | * | 4/1995 | Koenck et al. | ........ 235/472.02 |
| 5,468,952 A | | 11/1995 | Alexander et al. | |
| 5,613,237 A | * | 3/1997 | Bent et al. | ................... 455/351 |
| 5,625,688 A | * | 4/1997 | Ford et al. | ............. 379/433.09 |
| 6,036,098 A | | 3/2000 | Goldman et al. | |
| 6,292,573 B1 | * | 9/2001 | Zurek et al. | ................. 381/386 |
| 2002/0082042 A1 | * | 6/2002 | Mark et al. | ................. 455/550 |
| 2002/0131584 A1 | * | 9/2002 | Mote et al. | ................. 379/419 |
| 2003/0064750 A1 | * | 4/2003 | Oh et al. | ..................... 455/556 |
| 2004/0203518 A1 | * | 10/2004 | Zheng et al. | .............. 455/90.3 |

FOREIGN PATENT DOCUMENTS

GB 2 354 360 * 3/2001

OTHER PUBLICATIONS

PCT Search Report, PCT/US04/14144, mailed Dec. 1, 2004.
Tuan Tran & Karen L. Wood. International Search Report, Dec. 9, 2004, Alexandria, VA. 1 pg.

* cited by examiner

*Primary Examiner*—Tuan A. Tran
(74) *Attorney, Agent, or Firm*—Amin, Turocy & Calvin, LLP

(57) ABSTRACT

A hand held mobile terminal includes at least one torque cell for facilitating a torsionally stiff housing structure. The torque cell includes a plurality of first locking members located around a perimeter of a first housing and a plurality of second locking members located around a perimeter of a second housing. The first and second locking members are slidably engageable with each other so as to create a plurality of interlocking joints around the perimeter of the torque cell. Accordingly, the torque cell structure provides several advantages over the conventional mobile terminal housing, such as: better torsional rigidity, simplified assembly, improved volumetric efficiency, reduced need for shock absorbing materials, lighter overall weight, decoupling of impact loads, and mitigation of stress concentrations.

18 Claims, 8 Drawing Sheets

TORQUE CELL

CROSS REFERENCE TO RELATED APPLICATIONS

This application claims the benefit of U.S. Provisional Application Ser. No. 60/470,008, filed on May 13, 2003, and entitled TORQUE CELL.

TECHNICAL FIELD

The present invention generally relates to portable electronic devices. In particular, the present invention relates to systems and methods for a rugged housing design for a mobile terminal.

BACKGROUND OF THE INVENTION

Hand held mobile terminals have become widely accepted as personal and business organizational tools. Many users carry hand held mobile terminals on a daily basis. Accordingly, it is desired that housings for mobile terminals meet a number of criteria. A housing for a hand held mobile terminal should be aesthetically appealing. Moreover, the housing should be rugged to protect inner electronics from damage in the event of a drop. As mobile terminals become more and more powerful, a need for strength in the housing is at odds with a need to minimize volume occupied by the housing, and thus unavailable for packaging the electronics. Further, any mechanism used to hold the housing together should minimize any volume occupied and provide a secure latching system to prevent the disengagement of the housing parts.

Hand held mobile terminals are generally assembled by enclosing internal electrical components, such as a Central Processing Unit (CPU) board, display, keyboard, and internal wiring, within a housing made of plastic or another structural material. The enclosure is normally formed in two parts having an upper housing and a lower housing. The electronic components are mounted to one or both sides of the housing with or without subframes. The display and sometimes the battery are also located within the enclosure. The display and the battery represent large masses that can impart undesirable impact loads to the CPU board during a drop event.

FIG. 11 depicts a conventional housing 1100 for a hand held mobile terminal. The housing 1100 comprises two halves 1110 and 1120. The two halves 1110 and 1120 are fastened together to contain electronics (not shown). Bosses 1130 are included in the housing 1100 such that fasteners 1140 can penetrate both sides of the housing 1100. The fasteners, or screws, 1140 are inserted through bosses 1130 on one half of the housing 1100 through to the other half of the housing to provide the closing force needed to hold the assembly together. These features use volume that would otherwise be utilized for electrical components. Thus, the existence of bosses 1130 reduces volumetric efficiency of the housing 1100.

Additionally, the assembly of the components into the housing 1100 requires several manufacturing processes. Before the housing 1100 is fastened together, the CPU board, the display and other components must be assembled to a subframe, to the housing, or to some other subassembly. Such assembly steps are generally time consuming and expensive in manufacturing.

Further, the conventional housing assembly has poor torsional rigidity due to discontinuity of the housing surfaces at the mating band. Accordingly, stresses from deflections and impact loads during a drop are concentrated at the bosses 1130. Housing failure is often attributed to boss failure caused by deflection and impact load stresses.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides systems and methods for a rugged hand held mobile terminal design. The mobile terminal includes at least one torque cell for facilitating a torsionally stiff housing structure. The mobile terminal design includes a base housing having a portion of a torque cell and a rear cover having a mating portion of the torque cell. The torque cell includes a plurality of first locking members located around a perimeter of the base housing torque cell portion and a plurality of second locking members located around a perimeter of the rear cover torque cell portion. The first and second locking members are slidably engageable with each other so as to create a plurality of interlocking joints around the perimeter of the torque cell. Accordingly, the need for bosses and/or fastening hardware is mitigated. Alternatively, a handle portion having a plurality of second locking members can be coupled to the base housing to create a gun-shaped mobile terminal. The mobile terminal structure can also include a second torque cell for coupling a modular keypad to the terminal. The torque cell structure of the present invention provides several advantages over the conventional mobile terminal housing, such as: better torsional rigidity, simplified assembly, improved volumetric efficiency, lighter overall weight, mitigation of stress concentrations and a uniform compression of a sealing gasket for waterproof mobile terminals.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
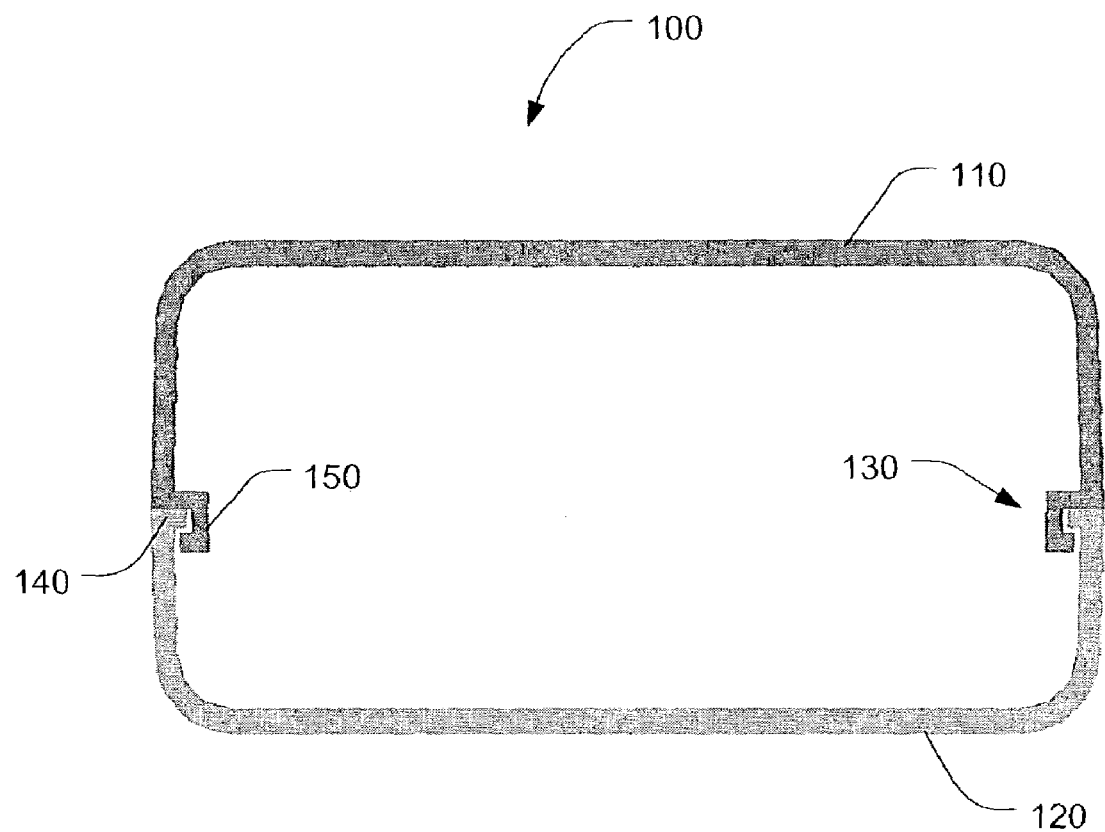
FIG. 1 illustrates a cross section of a mobile terminal with a torque cell structure according to one aspect of the present invention.

The present invention relates to systems and methods for a rugged hand held mobile terminal design. The present invention will now be described with reference to the drawings, wherein like reference numerals are used to refer to like elements throughout. It is to be appreciated that the various drawings are not drawn to scale from one figure to another nor inside a given figure, and in particular that the size of the components are arbitrarily drawn for facilitating the reading of the drawings. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

Referring initially to FIG. 1, an example of a torque cell structure 100 for a mobile terminal housing is depicted. This figure represents a cross section through the mobile terminal. The mobile terminal housing comprises an upper housing 110 and a lower housing 120, which are coupled via an interlocking joint 130 located around a perimeter portion of the mobile terminal. The interlocking joint 130 includes first and second locking members from the upper housing and the lower housing, respectively. For example, the lower housing can include a substantially L-shaped member 140 and the upper housing can include a receiving member 150 configured to slidably receive and interlock with the L-shaped member 140. However, it is to be appreciated that any other suitable locking members can be employed and is contemplated as falling within the scope of the present invention. As will be discussed in greater detail below, the interlocking joints 130 are located about the perimeter so as to create a distributed load path such that there are no concentrated loads on the housing. Accordingly, clamping on a perimeter seal of the housing is substantially uniform. Moreover, the mobile terminal housing employing the torque cell structure 100 is structurally stiffer in torsion and bending as compared to the conventional housing, which employs bosses and/or fastening hardware.

Figure 2:
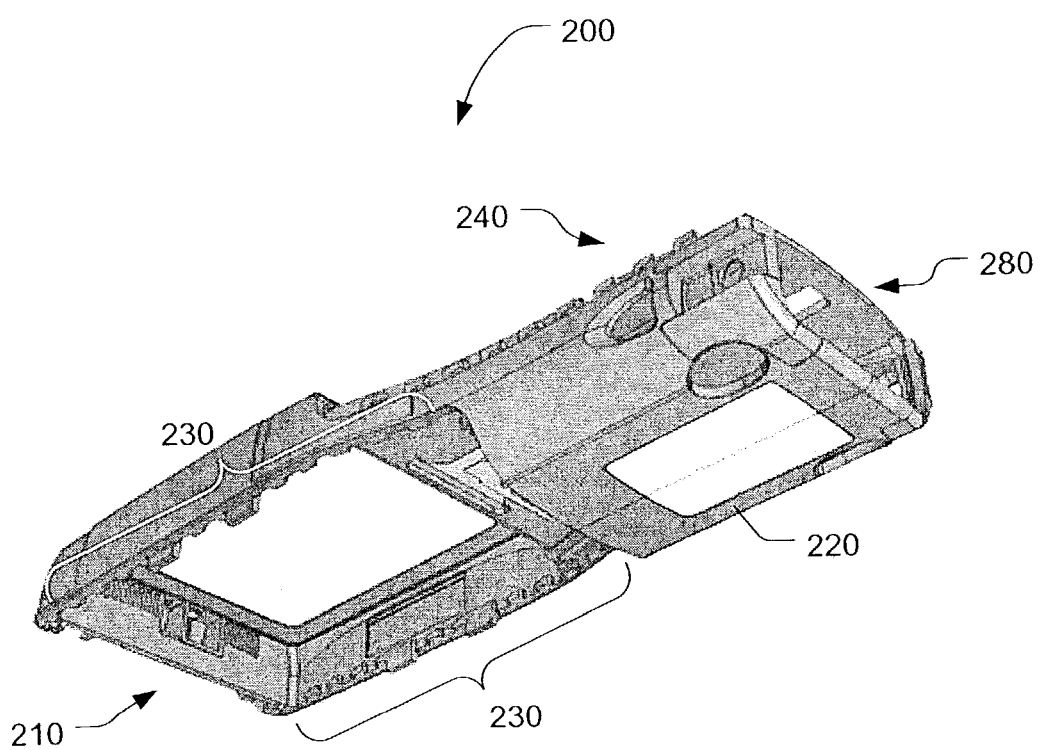
FIG. 2 illustrates a perspective view of a hand held mobile terminal design having a torque cell in accordance with an aspect of the present invention.
Figure 6:
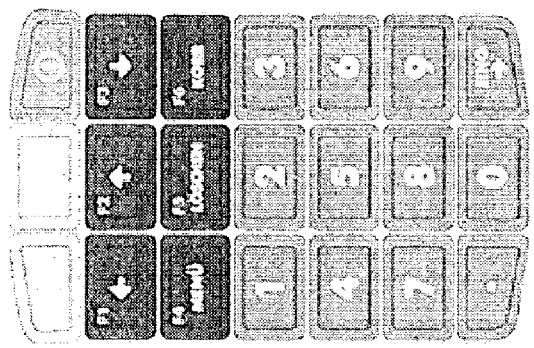
FIG. 6 illustrates an example of a module keypad in accordance with an aspect of the present invention.
Figure 5:
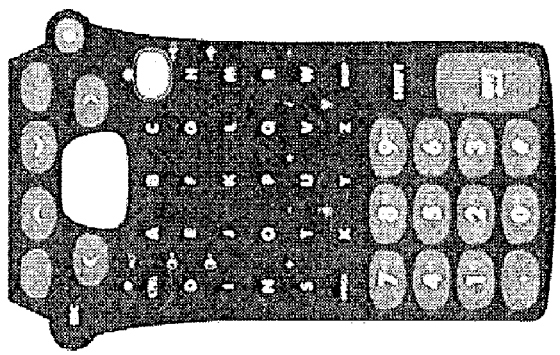
FIG. 5 illustrates an example of a module keypad in accordance with an aspect of the present invention.
Figure 4:
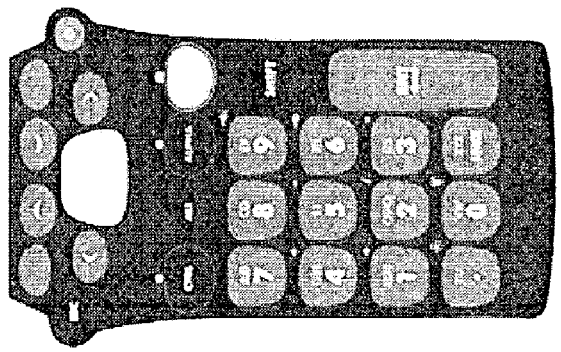
FIG. 4 illustrates an example of a module keypad in accordance with an aspect of the present invention.
Figure 3:
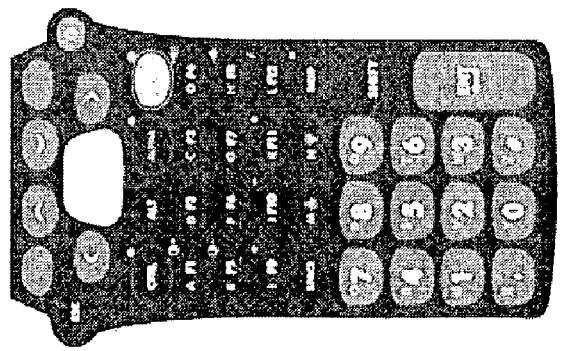
FIG. 3 illustrates an example of a module keypad in accordance with an aspect of the present invention.

In FIG. 2, an example of a hand held mobile terminal housing design 200 is illustrated. The hand held mobile terminal 200 can be a palm top ("palm-sized") portable computer system, a cellular telephone, global positioning system (GPS), bar code scanner, or the like. The hand held mobile terminal 200 comprises a generally bar-shaped elongate housing having two generally opposed long broad upper faces, two generally opposed long, shallow side faces, a rear end, and a front end. The housing can be fabricated from metal, plastic, or any other suitable structural material. At least one torque cell is provided within the housing. For example, a first torque cell 210 can be located at a top rear portion of the housing to house a display (not shown) for the mobile terminal 200. The display can display information relating to a mode of operation of the mobile terminal 200, or display check information relating to an item being read by an optical scanner (not shown) located in the mobile terminal 200. The display can be a touch screen and may employ capacitive, resistive touch, infrared, surface acoustic wave, or grounded acoustic wave technology. Further, the display can be a liquid crystal device, cathode ray tube (CRT), field emission device (FED, also called flat panel CRT) or any other display device suitable for creating graphic images and alphanumeric characters recognizable to the user.

The first torque cell 210 includes a plurality of interlocking joints located around a perimeter of the first torque cell 210. The first torque cell 210 comprises two housing portions: a base housing 220 and a rear cover (not shown). The base housing 220 includes a plurality of first locking members 230 located along a perimeter of two opposing sides of the first torque cell 210. The rear cover portion includes a plurality of corresponding second locking members, which are adapted to slidably engage with the first locking members 230 located on the base housing 220, as will be described in further detail below. The interlocking joint between the base housing 220 and the rear cover facilitates a torsionally stiff structure such that the mobile terminal 200 can be twisted and/or dropped without failure. For example, the mobile terminal 200 can be dropped repeatedly from a distance of approximately six feet without failure. Moreover, the interlocking joints are substantially evenly distributed about a perimeter portion of the torque cell 210 to create a distributed load along the perimeter of the housing. Thus, external loads are carried by the housing without discontinuities or stress concentrations. Accordingly, the structure of the mobile terminal 200 is more rigid than the conventional mobile terminal housing design, as described with respect to FIG. 10.

Moreover, a first gasket (not shown) can be provided about a perimeter of the display opening and/or the display itself and a second gasket (not shown) can be provided about a perimeter of the torque cell 210. The first and second gaskets are operable to mitigate contamination, which might otherwise enter the mobile terminal assembly from outside and thereby affect performance of the mobile terminal 200. By providing a plurality of interlocking components about a perimeter of the torque cell 210, clamping on the gasket is substantially uniform around the torque cell 210. The gaskets can be of rubber, foam, or any other elastomer, operable to sufficiently seal the assembly of the mobile terminal 200.

A second torque cell 240 can be located at a front bottom portion of the mobile terminal 200. The second torque cell 240 can be employed to couple a modular keypad to the mobile terminal. The modular keypad facilitates manufacturing and service, marketing flexibility, expansion and accessory, and customer reconfiguration. Examples of modular keypads which can be employed with the mobile terminal are illustrated with respect to FIGS. 3-6. The selected keypad can be employed to enter identification information concerning the user into the mobile terminal. Additionally, the keypad can be utilized to enter information concerning modes of operation of the mobile terminal or to carry out cancellation or manipulation operations on information provided by the terminal.

Figure 7:
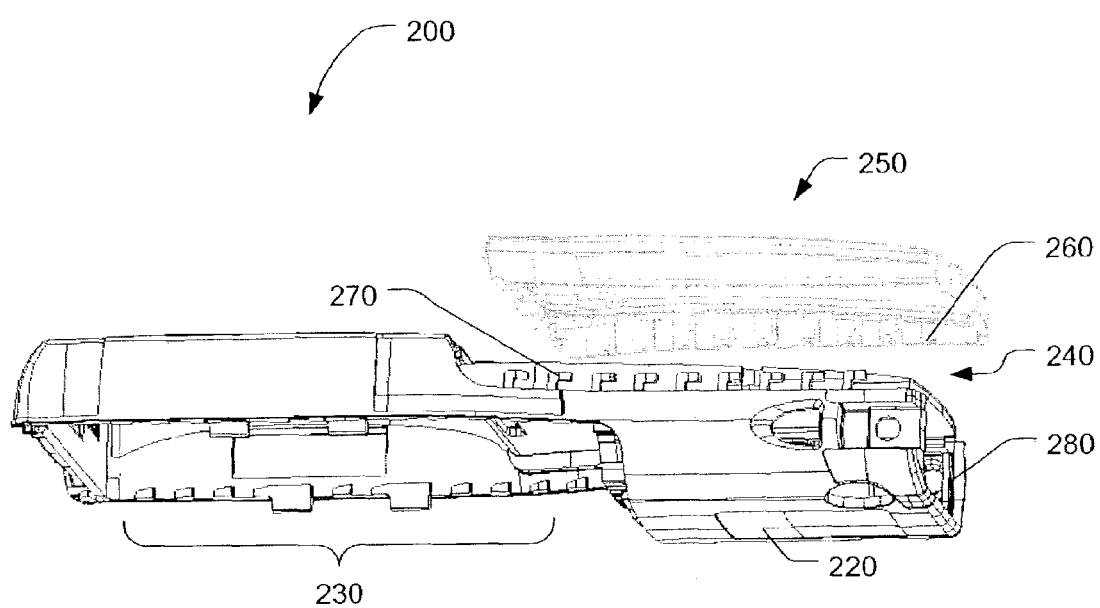
FIG. 7 illustrates a perspective side view of the hand held mobile terminal of FIG. 2 in accordance with an aspect of the present invention.

Turning now to FIG. 7, the second torque cell 240 for the mobile terminal of FIG. 2 is better illustrated. The second torque cell 240 comprises the base housing 220 and a modular keypad 250. When the modular keypad 250 is coupled to the base housing 220, L-shaped members, or latches, 260 on the keypad are aligned with corresponding latch receiving members 270 on the base housing 220. The modular keypad 250 can be slidably moved into engagement with the base housing 220 to create a plurality of interlocking joints around a perimeter portion of the second torque cell 240. The interlocking joints can be substantially evenly distributed about the perimeter of the second torque cell 240 so as to create a distributed load around the perimeter. Accordingly, the possibility of disengagement of the mobile terminal housing during impact is substantially reduced as the interlocking joints between the modular keypad 250 and the base housing 220 facilitates a torsionally stiff structure. The modular keypad 250 can be disassembled from the mobile terminal 200 by slidably disengaging the keypad latches 260 and the mating housing latches 270.

The mobile terminal 200 also includes an open end 280 in the base housing 220 for receiving a battery to power the terminal 200. It is to be appreciated that although the open end 280 is illustrated as being located at a bottom portion of the housing, the open end 280 can also be located at any other suitable portion of the terminal 200. An acoustic modem can also be provided for uploading and/or downloading information to and from the terminal 200. Additionally, the mobile terminal 200 can include a communication interface for information transfer. For example, the communication interface can be a serial communication port and/or any other suitable communication standard and/or protocol, e.g., parallel, SCSI, Firewire (IEEE 1394), Ethernet, etc. Additionally, a radio transmitter can be provided for transmitting information to a remote receiver and/or a radio receiver can be provided for receiving information from a remote transmitter.

Figure 8:
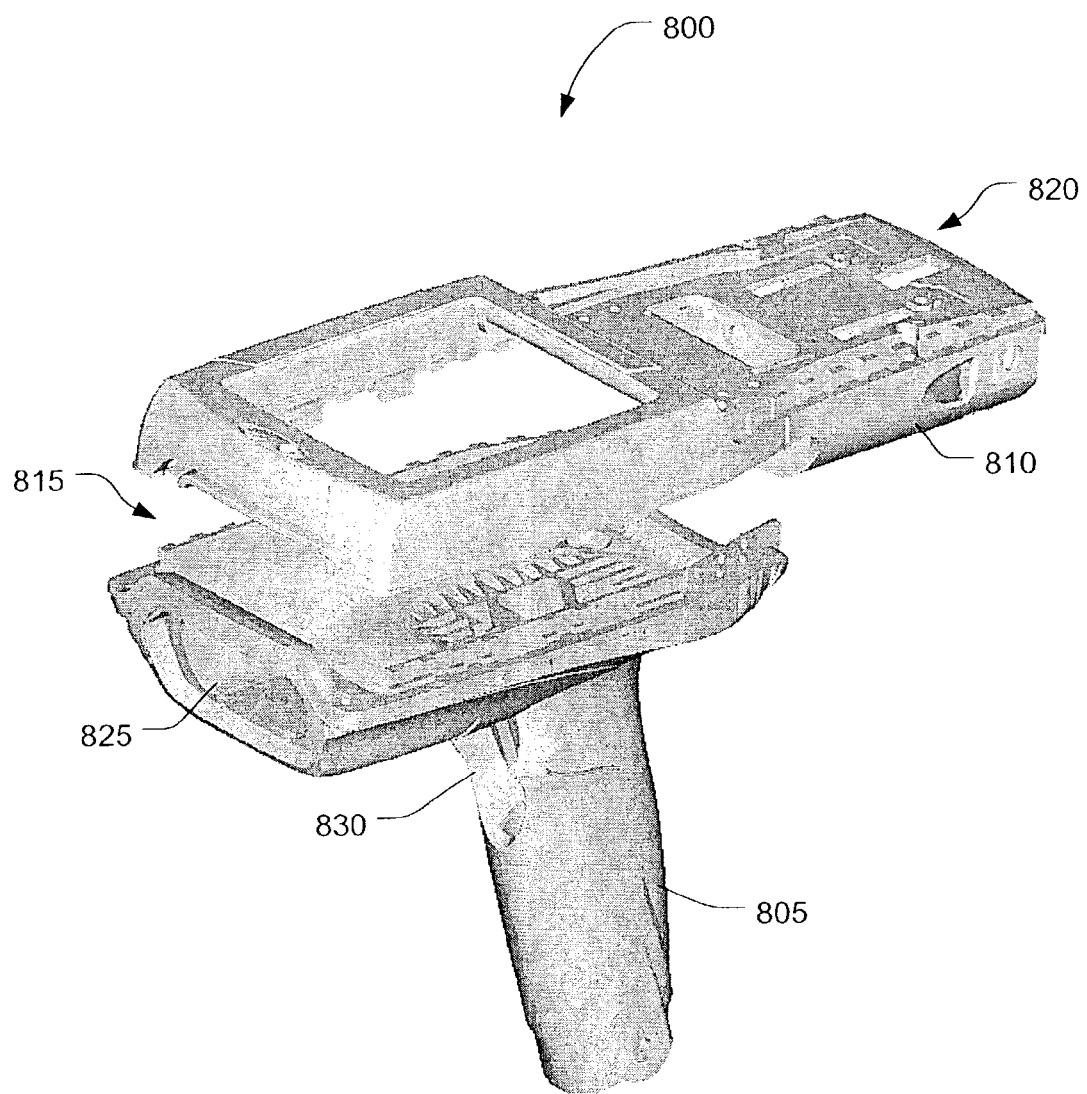
FIG. 8 illustrates a perspective view of another hand held mobile terminal design having a torque cell in accordance with an aspect of the present invention.

Turning now to FIG. 8, another example of a hand held mobile terminal design is depicted. The mobile terminal can be an optical reader 800 in the shape of a gun having a handle portion 805 and a base portion 810. The handle and base portions 805 and 810 can be fabricated from metal, plastic, or any other suitable structural material. The mobile terminal 800 includes at least one torque cell, which improves mechanical efficiency and reduces assembly time for the mobile terminal 800. Bosses and/or fastening hardware as required by conventional housings are unnecessary in the mobile terminal 800 of the present invention as the torque cell(s) includes a plurality of interlocks. Thus, external loads are carried by the torque cell(s) without discontinuities or stress concentrations. Accordingly, the structure of the mobile terminal 800 is more rigid than the conventional design.

A first torque cell 815 can be formed between the handle portion 805 and the base portion 810. The handle portion 805 includes a plurality of first locking members located along two opposing sides of a perimeter of the torque cell 815. Likewise, the base portion 810 includes a plurality of second locking members located along two opposing sides of a perimeter of the torque cell 815. The first and second locking members are slidably engageable with each other so as to create a torsionally stiff coupling between the base portion 810 and the handle portion 805. The mobile terminal 800 also includes a second torque cell 820 for coupling a modular keypad (not shown) to the base portion 810. The modular keypad can be coupled to the base portion 810 in a manner similar to that described with respect to FIG. 7 herein. Accordingly, such description will be omitted for the sake of brevity.

A reading window 825 through which a light beam passes is generally located at an end face of the base portion 810, and the reader 800 is aimed at indicia to be read by a user holding the handle portion 805. A trigger 830 can be situated in a region of a junction between the handle portion 805 and the base portion 810 for operation by the user to actuate the optical reader 800. The trigger 830 can be of any known arrangement. For example, the trigger 830 can be spring-loaded and have contacts which form a circuit with contacts within the housing when the trigger 830 is depressed to actuate the reader 800. Power can be conserved with such an arrangement as the reader 800 will be activated when the trigger 830 is depressed; thereby allowing the reader 800 to remain idle when no indicia are to be read.

Figure 9:
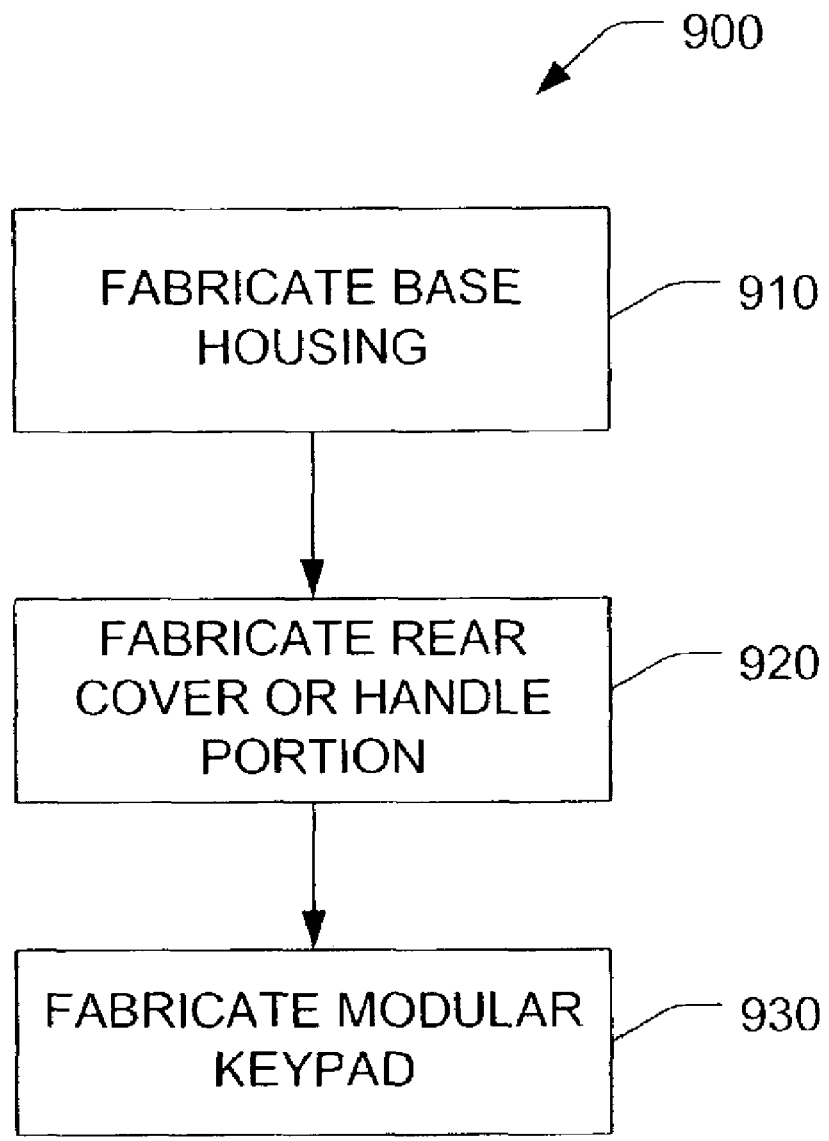
FIG. 9 illustrates a methodology for fabricating a hand held mobile terminal housing in accordance with an aspect of the present invention.
Figure 10:
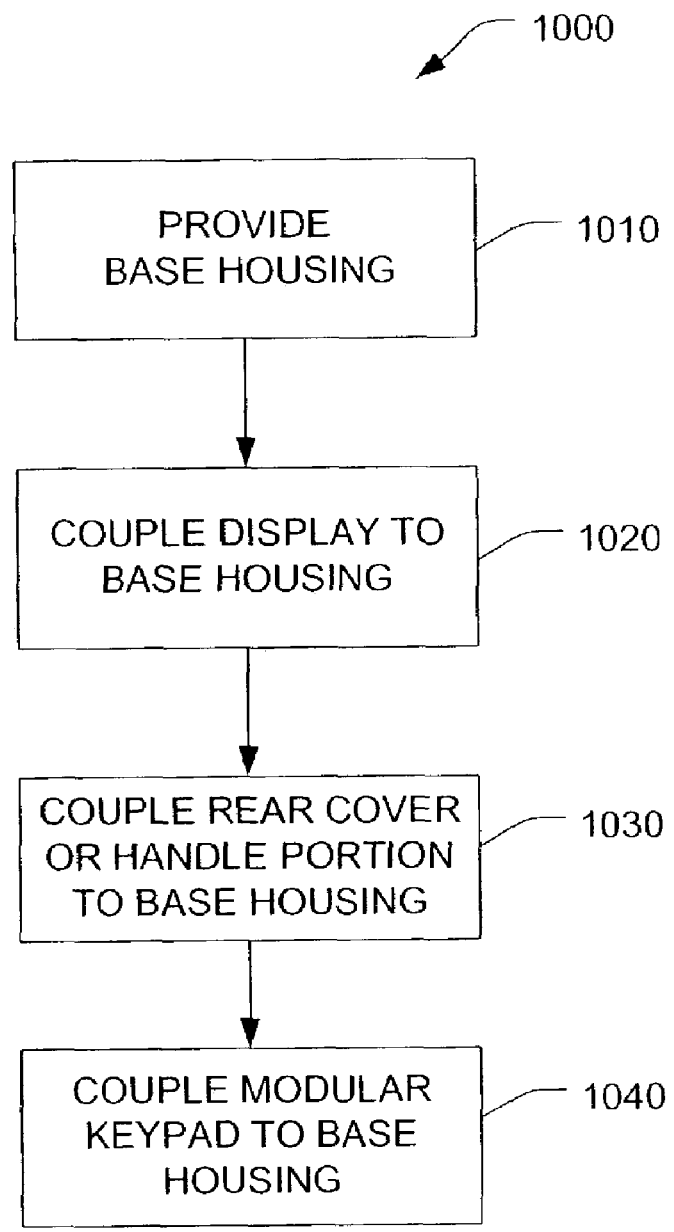
FIG. 10 illustrates a methodology for assembling a hand held mobile terminal in accordance with an aspect of the present invention.
Figure 11:
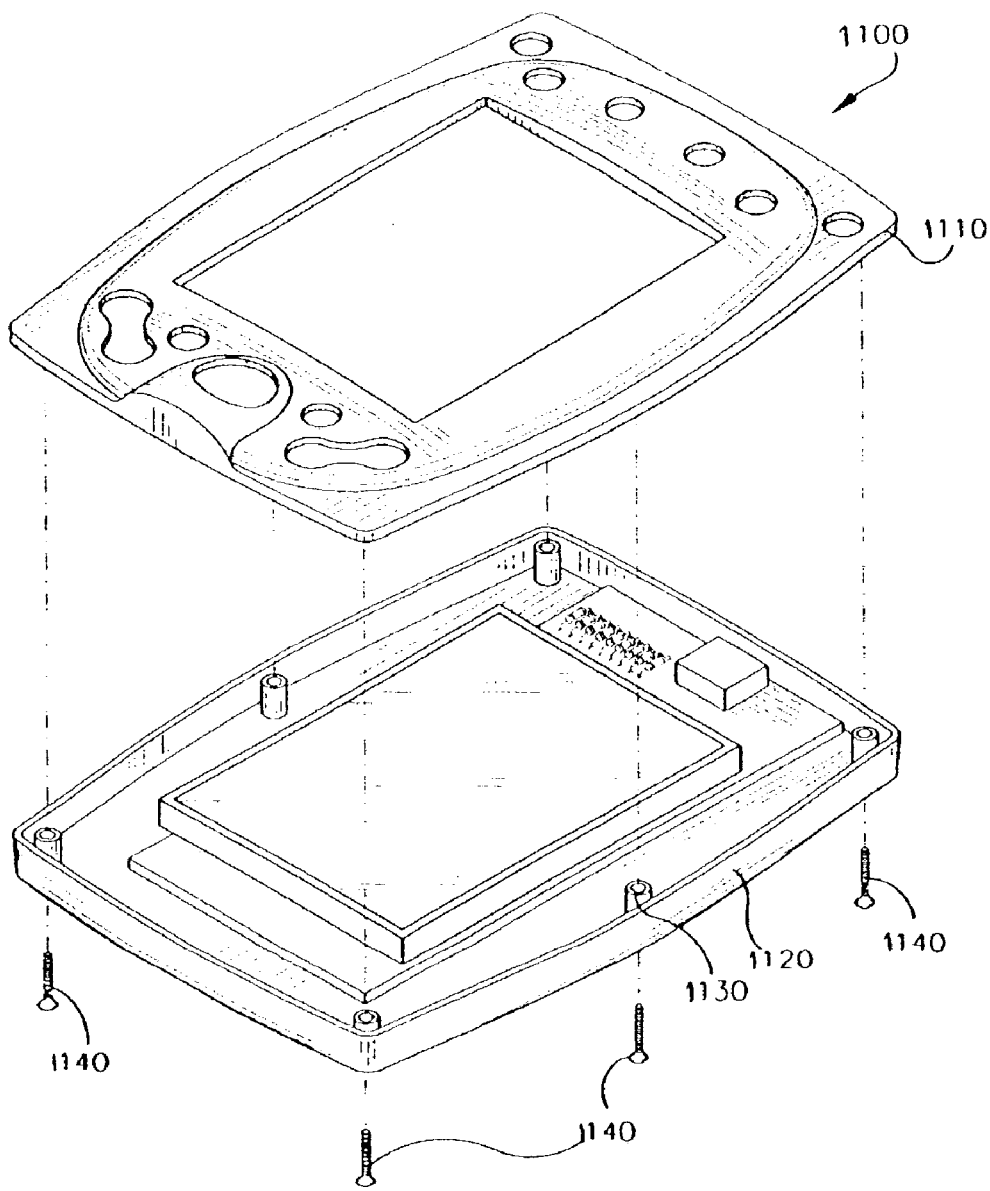
FIG. 11 illustrates a conventional hand held mobile terminal housing.

In view of the foregoing structural and functional features described above, methodologies in accordance with various aspects of the present invention will be better appreciated with reference to FIGS. 9-10. While, for purposes of simplicity of explanation, the methodologies of FIGS. 9-10 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Turning now to FIG. 9, a methodology 900 for fabricating a hand held mobile terminal is illustrated. The methodology begins at 910 where a base housing is fabricated from any suitable structural material, such as plastic and/or metal. The base housing includes first and second torque cell portions located therein. At 920, a rear cover is fabricated with a third torque cell portion which corresponds with the first torque cell portion. The torque cells include a plurality of interlocking structures to facilitate a torsionally stiff coupling between the base housing and the rear cover. The interlocking structures are configured such that the base housing and the rear cover are slidably engageable with each other. Alternatively, a handle portion can be formed at 920 and coupled to the base housing via a plurality of interlocks. At 930, a modular keypad having a fourth torque cell portion is formed. The fourth torque cell portion has a plurality of interlocking structures which correspond to mating interlocking structures located in the second torque cell portion. Accordingly, the modular keypad can slidably engage the base housing to create a torsionally stiff structure.

FIG. 10 depicts a methodology for assembling a housing for a hand held mobile terminal is depicted. The methodology begins at 1010 where a base housing is provided. The base housing can be of any suitable material, such as plastic and/or metal. The base housing includes first and second torque cell portions. At 1020, a display is coupled to the base housing. Then, at 1030, a rear cover or handle portion having a third torque cell portion is provided over the display. Interlocking structures in the third torque cell portion are slidably engaged with interlocking structures in the first cell portion to couple the rear cover to the base housing. At 1040, a modular keypad is coupled to the base housing. The modular keypad includes a fourth torque cell portion which comprises interlocking structures that slidably engage with interlocking structures located in the second torque cell portion to couple the modular keypad to the base housing.

It is to be appreciated that the rugged hand held mobile terminal design of the subject invention, as described herein, has wide applicability. The design can be employed for example in numerous types of commercial and industrial electronic devices (e.g., computers, personal digital assistants, cameras, electronic games . . . ). Moreover, the methodologies of the subject invention can be employed in connection with processes associated with fabricating rugged housings related to such devices. It is also to be appreciated that the scope of the present invention is intended to include any portable electronic device.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A hand held mobile terminal housing comprising:
    an upper housing having a peripherally disposed elastomeric seal;
    a lower housing that slidably engages with the upper housing via a plurality of interlocking joints to vise the elastomeric seal and create a torsionally stiff structure, the plurality of interlocking joints are evenly distributed about entire lateral members of a perimeter of the mobile terminal housing; and
    a modular keypad coupled to the upper housing via a plurality of interlocking joints.

2. The hand held mobile terminal housing of claim 1, wherein the upper and lower housing are structurally coupled together without employing bosses and fastening hardware.

3. The hand held mobile terminal housing of claim 1, wherein the interlocking joint comprises a first locking member located on the upper housing and a second locking member located on the lower housing.

4. The hand held mobile terminal housing of claim 3, wherein at least one of the first and second locking members is an L-shaped member.

5. The hand held mobile terminal housing of claim 1, wherein the plurality of interlocking joints are distributed about the perimeter of the mobile terminal housing so as to create a distributed load path along the perimeter.

6. A personal digital assistant employing the housing of claim 1.

7. A cellular telephone employing the housing of claim 1.

8. An electronic game employing the housing of claim 1.

9. At least one of a barcode scanner and imager employing the housing of claim 1.

10. A hand held mobile terminal housing comprising:
    a base housing having a first torque cell portion;
    a rear cover having a second torque cell portion which is slidably engageable with the first torque cell portion, the rear cover including a perimeter gasket interposed between the base housing and the rear cover, wherein the first and second torque cell portions comprise a plurality of interlocking joints substantially evenly distributed about entire lateral members of a perimeter of the mobile terminal housing; and
    a modular keypad coupled to the base housing via a plurality of interlocking joints.

11. The hand held mobile terminal housing of claim 10, wherein the first torque cell portion includes a plurality of first locking members and the second torque cell portion includes a plurality of second locking members that slidably engage with the first locking members to create the plurality of interlocking joints.

12. The hand held mobile terminal housing of claim 11, wherein the first locking members are substantially evenly distributed about a perimeter of the first torque cell portion and the second locking members are substantially evenly distributed about a perimeter of the second torque cell portion.

13. The hand held mobile terminal housing of claim 10 being fabricated from metal.

14. The hand held mobile terminal housing of claim 10 being fabricated from plastic.

15. A hand held mobile terminal housing comprising:
    a base portion having a plurality of first locking members substantially evenly distributed about entire lateral members of a perimeter of the base portion, the base portion including a peripherally disposed elastomeric isolate, the base portion further having a plurality of third locking members, such that the base portion can be coupled to a plurality of fourth locking members in a handle portion to form a gun-shaped mobile terminal or a plurality of fifth locking members in a rear cover to form a bar-shaped mobile terminal; and
    a modular keypad having a plurality of second locking members substantially evenly distributed about entire lateral members of a perimeter of the modular keypad.

16. The hand held mobile terminal housing of claim 15, wherein the first locking member and second locking members are slidably engageable with each other thereby clamping the elastomeric isolate.

17. The hand held mobile terminal housing of claim 15, wherein the first and second locking members create a torsionally stiff coupling between the base portion and the modular keypad.

18. A hand held mobile terminal housing comprising:
    an upper housing having first interlocking means;
    a lower housing having a peripheral elastomeric means and a second interlocking means, the elastomeric means interposed between the upper housing and the lower housing, and the first and second interlocking means evenly distributed about entire lateral members of a perimeter of the mobile terminal housing; and
    a modular keypad coupled to the upper housing via a plurality of interlocking means.

* * * * *